US010437775B2

(12) United States Patent
Kochevar-Cureton et al.

(10) Patent No.: US 10,437,775 B2
(45) Date of Patent: Oct. 8, 2019

(54) REMOTE DIRECT MEMORY ACCESS IN COMPUTING SYSTEMS

(71) Applicant: Microsoft Technology Licensing, LLC, Redmond, WA (US)

(72) Inventors: Alec Kochevar-Cureton, Bellevue, WA (US); Somesh Chaturmohta, Redmond, WA (US); Norman Lam, Sammamish, WA (US); Sambhrama Mundkur, Sammamish, WA (US); Daniel Firestone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 15/824,925

(22) Filed: Nov. 28, 2017

(65) Prior Publication Data

US 2019/0079897 A1 Mar. 14, 2019

Related U.S. Application Data

(60) Provisional application No. 62/558,827, filed on Sep. 14, 2017.

(51) Int. Cl.
*G06F 15/167* (2006.01)
*G06F 15/173* (2006.01)
(Continued)

(52) U.S. Cl.
CPC .... *G06F 15/17331* (2013.01); *G06F 9/45558* (2013.01); *G06F 15/76* (2013.01);
(Continued)

(58) Field of Classification Search
CPC .............. G06F 15/17331; G06F 15/76; G06F 9/45558; G06F 2009/45583; H04L 45/24;
(Continued)

(56) References Cited

U.S. PATENT DOCUMENTS

| 9,729,442 B1 | 8/2017 | Stark et al. |
| 2013/0148668 A1 | 6/2013 | Kean et al. |

(Continued)

FOREIGN PATENT DOCUMENTS

CN 106845381 A 6/2017

OTHER PUBLICATIONS

Weinzaepfel, et al., "Learning to Track for Spatio-Temporal Action Localization", In Proceedings of the IEEE International Conference on Computer Vision, Dec. 7, 2015, pp. 3164-3172.

(Continued)

*Primary Examiner* — Wing F Chan
*Assistant Examiner* — Joseph R Maniwang
(74) *Attorney, Agent, or Firm* — Liang IP, PLLC

(57) ABSTRACT

Distributed computing systems, devices, and associated methods of remote direct memory access ("RDMA") packet routing are disclosed herein. In one embodiment, a server includes a main processor, a network interface card ("NIC"), and a field programmable gate array ("FPGA") operatively coupled to the main processor via the NIC. The FPGA includes an inbound processing path having an inbound packet buffer configured to receive an inbound packet from the computer network, a NIC buffer, and a multiplexer between the inbound packet buffer and the NIC, and between the NIC buffer and the NIC. The FPGA also includes an outbound processing path having an outbound action circuit having an input to receive the outbound packet from the NIC, a first output to the computer network, and a second output to the NIC buffer in the inbound processing path.

20 Claims, 15 Drawing Sheets

(51) Int. Cl.

| | | |
|---|---|---|
| H04L 29/06 | (2006.01) | |
| G06F 9/455 | (2018.01) | |
| H04L 12/801 | (2013.01) | |
| H04L 12/911 | (2013.01) | |
| H04L 12/935 | (2013.01) | |
| H04L 12/861 | (2013.01) | |
| H04L 12/707 | (2013.01) | |
| H04L 12/721 | (2013.01) | |
| H04L 12/717 | (2013.01) | |
| H04L 12/741 | (2013.01) | |
| G06F 15/76 | (2006.01) | |
| H04L 12/813 | (2013.01) | |
| H04L 12/931 | (2013.01) | |
| H04L 29/08 | (2006.01) | |

(52) U.S. Cl.
CPC .............. *H04L 45/24* (2013.01); *H04L 45/38* (2013.01); *H04L 45/42* (2013.01); *H04L 45/54* (2013.01); *H04L 47/193* (2013.01); *H04L 47/20* (2013.01); *H04L 47/34* (2013.01); *H04L 47/39* (2013.01); *H04L 47/741* (2013.01); *H04L 47/822* (2013.01); *H04L 49/3027* (2013.01); *H04L 49/3045* (2013.01); *H04L 49/354* (2013.01); *H04L 49/9068* (2013.01); *H04L 69/12* (2013.01); *G06F 2009/45583* (2013.01); *H04L 49/70* (2013.01); *H04L 67/1097* (2013.01); *H04L 69/161* (2013.01)

(58) Field of Classification Search
CPC ......... H04L 45/38; H04L 45/42; H04L 45/54; H04L 47/193; H04L 47/20; H04L 47/34; H04L 47/39; H04L 47/741; H04L 47/822; H04L 49/3027; H04L 49/3045; H04L 49/354; H04L 49/9068; H04L 49/70; H04L 69/12; H04L 69/161
USPC ....................................................... 709/213
See application file for complete search history.

(56) References Cited

U.S. PATENT DOCUMENTS

| | | | |
|---|---|---|---|
| 2014/0297775 A1* | 10/2014 | Davda | G06F 13/28 709/212 |
| 2016/0188527 A1* | 6/2016 | Cherian | H04L 45/74 709/212 |
| 2017/0034268 A1* | 2/2017 | Govind | H04L 67/1097 |
| 2017/0371835 A1* | 12/2017 | Ranadive | G06F 15/17331 |
| 2019/0081891 A1 | 3/2019 | Mundkur et al. | |
| 2019/0081899 A1 | 3/2019 | Mundkur et al. | |

OTHER PUBLICATIONS

Carlos, Guestrin, et al., "Dimensionality Reduction PCA", Retrieved From: https://courses.cs.washington.edu/courses/csep546/14wi/slides/pca-neuralnets-annotated.pdf, Feb. 18, 2014, 62 Pages.

Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.

"International Search Report and Written Opinion Issued in PCT Application No. PCT/US2018/038874", dated Sep. 27, 2018, 13 Pages.

"International Search Report & Written Opinion Issued in PCT Application No. PCT/US2018/039637", dated Sep. 10, 2018, 13 Pages.

"International Search Report & Written Opinion Issued in PCT Application No. PCT/US2018/039638", dated Sep. 10, 2018, 13 Pages.

"International Search Report & Written Opinion Issued in PCT Application No. PCT/US2018/039640", dated Sep. 10, 2018, 12 Pages.

Shao, et al., "Slicing Convolutional Neural Network for Crowd Video Understanding", In Proceedings of the IEEE Conference on Computer Vision and Pattern Recognition, Jun. 27, 2016, pp. 5620-5628.

Tonsing, Johann, "OVS Acceleration Using Network Flow Processors", Retrieved From: http://www.openvswitch.org/support/ovscon2014/18/1300-ovs-accel-nfp-2014-11-18.pdf, Nov. 18, 2014, 23 Pages.

"Non Final Office Action Issued In U.S. Appl. No. 15/824,914", dated May 16, 2019, 8 Pages.

\* cited by examiner

| Conditions | Actions |
|---|---|
| Source/Dest MAC | Allow/Block (Stateful/Stateless) |
| Source/Dest IP | NAT (L3/L4), (Stateful/Stateless) |
| Source/Dest TCP Port | |
| Source/Dest UDP Port | Encap/Decap |
| GRE Key | QoS – Rate Limit, Mark DSCP, Meter |
| VXLAN VNI | |
| VLAN ID | Encrypt/Decrypt |
| Metadata From Previous Layer | Stateful Tunneling |
| | Routing (ECMP) |

*FIG. 6*

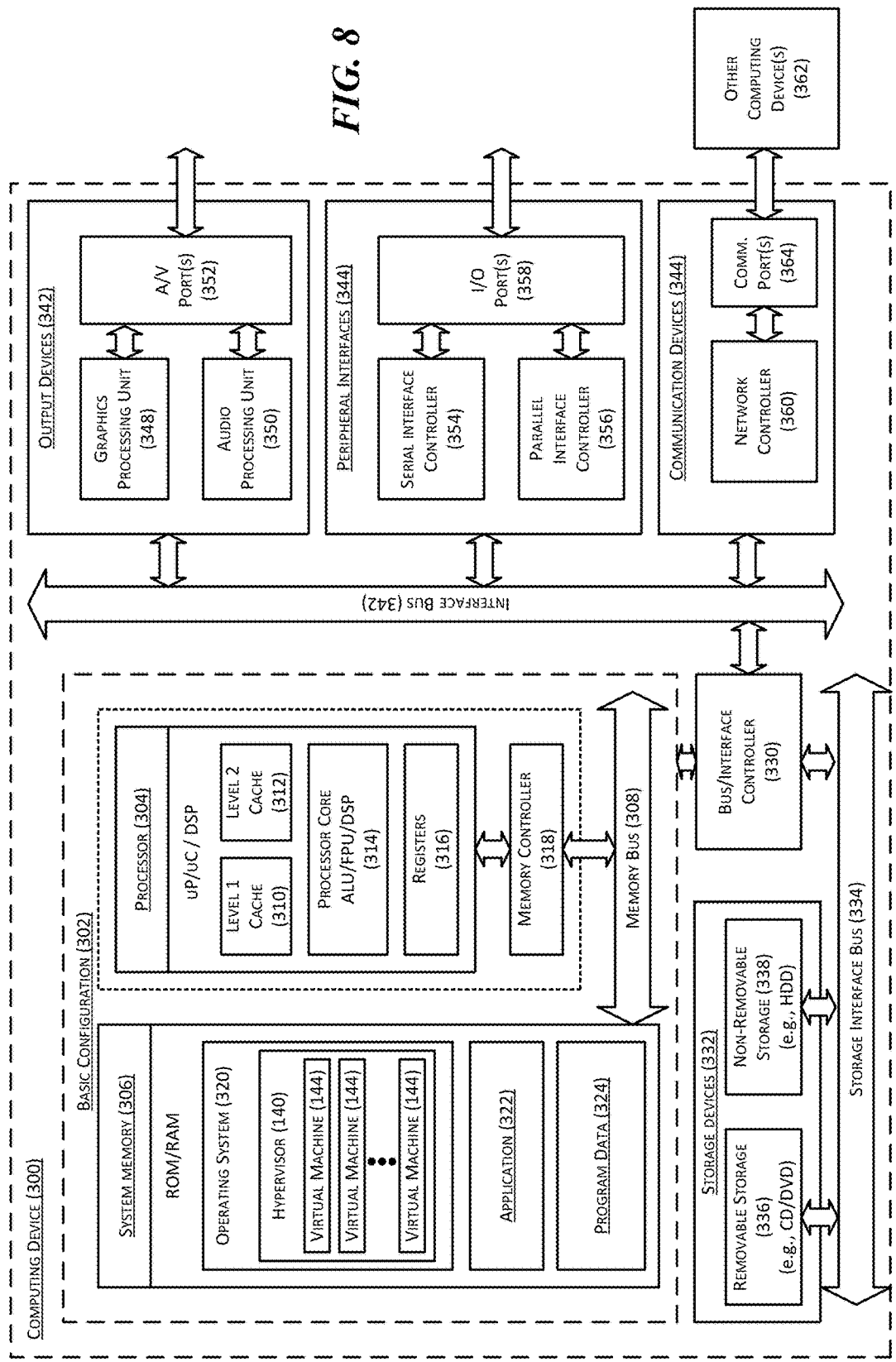

REMOTE DIRECT MEMORY ACCESS IN COMPUTING SYSTEMS

CROSS-REFERENCE TO RELATED APPLICATION(S)

This application is a Non-provisional application of and claims priority to U.S. Provisional Application No. 62/558,827, filed on Sep. 14, 2017.

BACKGROUND

Distributed computing systems typically include routers, switches, bridges, and other physical network devices that interconnect large numbers of servers, network storage devices, or other types of computing devices. The individual servers can host one or more virtual machines ("VMs"), virtual switches, or other types of virtualized functions. The virtual machines can facilitate execution of suitable applications for individual users to provide desired cloud services or other suitable types of computing services to the users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In cloud-based datacenters or other types of large scale distributed computing systems, overlay protocols such as Virtual Extensible Local Area Network and virtual switching can involve complex packet manipulation actions. As such, processing complexity related to server-based networking data plane has increased dramatically to support such overlay protocols. With ever increasing network interface bandwidths, performing these complex packet manipulation actions in software imposes a heavy burden on processing resources at the servers to leave little or no processing resources to run user applications.

To address such challenges, certain hardware circuitry has been developed for offloading at least a portion of the data plane processing from server processors. For example, servers can incorporate a Field Programmable Gate Array ("FPGA") by coupling the FPGA to a Network Interface Card ("NIC") and a Central Processing Unit ("CPU"). During runtime, a software controller at the CPU can program the FPGA to perform flow action matching or other suitable data plane actions. For instance, the FPGA can be configured to implement an inbound processing path that includes an inbound packet buffer for holding received inbound packets, a parser configured to parse headers of the inbound packets, a lookup circuit configured to locate one or more matching actions in a flow match table based on at least a portion of the parsed headers, and an action circuit configured to perform the one or more matching actions on the inbound packets. The FPGA can also include an outbound processing path that includes similar components coupled to one another in a reverse direction than the inbound processing path.

In operation, the inbound processing path can receive an inbound packet from a computer network via, for example, a top-of-rack switch ("TOR"), store the received inbound packet in the inbound packet buffer, parse headers of the received inbound packet, locate one or more matching actions for the packet based on at least a portion of the headers, and perform the one or more matching actions on the inbound packet before forwarding the processed inbound packet to the NIC. The outbound processing path can receive an outbound packet from, for example, the NIC or the CPU, store the outbound packet in an outbound packet buffer, parse the received outbound packet, locate one or more matching actions for the outbound packet, and perform the one or more matching actions on the outbound packet before forwarding the processed outbound packet to the computer network, for example, via the same TOR.

The foregoing offloading implementation, however, have several drawbacks. For example, the FPGA in the foregoing offloading implementation directly forwards inbound/outbound packets to either the NIC or the TOR. Such direct forwarding does not allow remote direct memory access ("RDMA") among applications and/or virtual machines on a virtual network implemented on an underlay network in the distributed computing system. RDMA is a technique that allows a computer, a virtual machine, or an application to directly access memory locations of a remote computer via a computer network without involving either one's operating system. An RDMA connection can allow ultra-low latency (e.g., less than about 25 µs) communications between computers. RDMA can also have low processor utilization and high bandwidth on individual connections. RDMA can be implemented in various manners. In one example, RDMA can be implemented using hardware components such as hardware connection adapters ("HCAs") to process RDMA traffic using queue pairs. Such an implementation, however, involves installing and maintaining hardware components such, i.e., HCAs, in addition to NICs or other types of adapters needed to handle TCP/IP traffic in a computer network.

Typically, RDMA operations involve routing packets in hardware between pairs of network endpoints (e.g., HCAs) with routable addresses in an underlay network. As such, attempt to route RDMA packets using virtual network addresses would simply be inoperable. For example, when the FPGA described above receives a request-for-connection packet ("request packet") from a first virtual machine to a second virtual machine for an RDMA connection between the pair, the FPGA simply forwards the request packet to the TOR. The TOR, however, would not understand source/destination addresses associated with the request packet because the TOR does not have any entries in an associated routing table for the virtual network addresses, but instead network addresses in the underlay network. Thus, the TOR would deem the request packet as invalid and drop the request packet, causing the RDMA connection request to fail.

Embodiments of the disclosed technology can address the foregoing FPGA implementation drawback by allowing the FPGA to route RDMA connection packets inside the FPGA. For example, in one implementation, the inbound processing path of the FPGA can further include an output buffer between the action circuit and the NIC. The outbound processing path can further include a NIC buffer operatively coupled to the action circuit in the outbound processing path to receive input from the action circuit. A multiplexer can be configured to receive input from both the output buffer and the NIC buffer alternately, in a round-the-robin, or other suitable fashions. The multiplexer can also be configured to provide an output to the NIC.

During operation, when the FPGA receives a RDMA request packet from a first virtual machine on a first host to a second virtual machine on a second host, the outbound processing path can parse a header of the request packet, attempt to match the request packet to a flow in the flow table based on at least a portion of the parsed header. The action circuit can then raise an exception because the FPGA does not contain a flow that matches the request packet. The action circuit in the outbound processing path can then forward the request packet along with an exception flag to the NIC buffer instead of the TOR. In turn, the multiplexer can then retrieve the request packet with the exception flag from the NIC buffer and forward the request packet to a software component (e.g., a virtual switch) via the NIC. The software component can then generate a flow for the request packet based on, for example, certain RDMA connection policies in the distributed computing system, and transmit the request packet back to the outbound processing path along with information of the generated flow.

Upon receiving the request packet along with the information of the generated flow, the outbound processing path can then process the request packet according to the flow to, for instance, encapsulate the request packet with an underlay network address of a host at which the second virtual machine is hosted, and transmit the processed request packet to the TOR. The TOR can then forward the request packet to the host at which the second virtual machine is hosted according to the underlay network address, and thus enabling RDMA connection between the first and second virtual machines on a virtual network. Several embodiments of the disclosed technology can thus enable RDMA connections between pairs of virtual machines on virtual networks without requiring installation of additional NICs, HCAs, or other hardware components in the distributed computing system. As such, communications latency in the distributed computing system can be reduced using RDMA without incurring additional capital costs.

BRIEF DESCRIPTION OF THE DRAWINGS

FIG. 6 is a schematic diagram illustrating example conditions and corresponding actions for a rule object in a flow table suitable for a hardware packet processor in accordance with embodiments of the disclosed technology.

FIG. 8 is a computing device suitable for certain components of the distributed computing system in FIG. 1.

DETAILED DESCRIPTION

Figure 1:
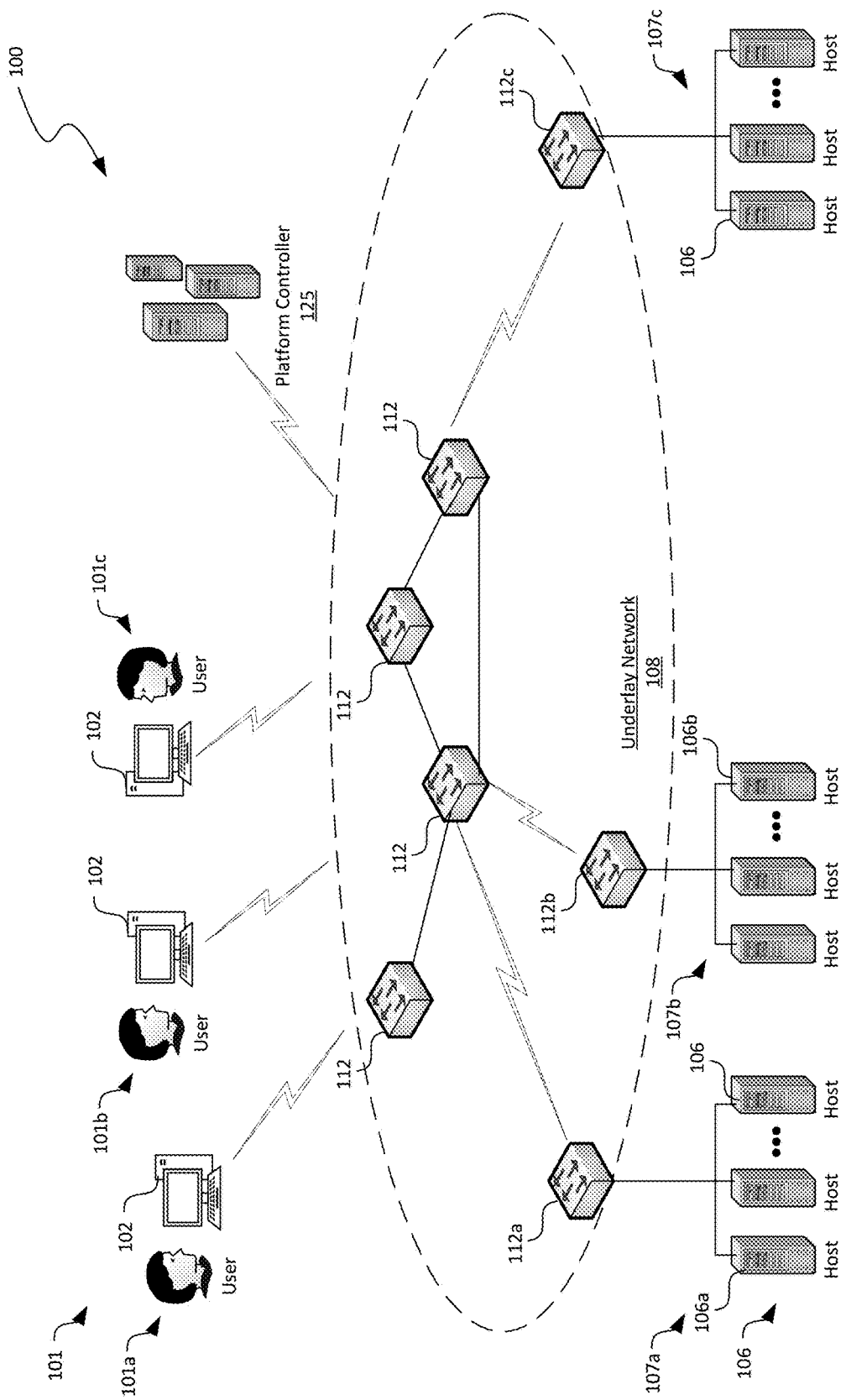
FIG. 1 is a schematic diagram illustrating a distributed computing system implementing RDMA network traffic routing in accordance with embodiments of the disclosed technology.

Certain embodiments of systems, devices, components, modules, routines, data structures, and processes for routing RDMA network traffic in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Further used herein, a Match Action Table ("MAT") generally refers to a data structure having multiple entries in a table format. Each of the entries can include one or more conditions and one or more corresponding actions. The one or more conditions can be configured by a network controller (e.g., an Software Defined Network or "SDN" controller) for matching a set of header fields of a packet. The action can also be programmed by the network controller to apply an operation to the packet when the conditions match the set of header fields of the packet. The applied operation can modify at least a portion of the packet to forward the packet to an intended destination. Further used herein, a "flow" generally refers to a stream of packets received/transmitted via a single network connection between two end points (e.g., servers, virtual machines, or applications executed in the virtual machines). A flow can be identified by, for example, an IP address and a TCP port number. A flow can have one or more corresponding entries in the MAT. Each entry can have one or more conditions and actions. Example conditions and actions are shown in FIG. 6.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information.

FIG. 1 is a schematic diagram illustrating a distributed computing system 100 implementing RDMA network traffic routing in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topology. The underlay network can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the provided virtual machines 144 to perform computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access cloud services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
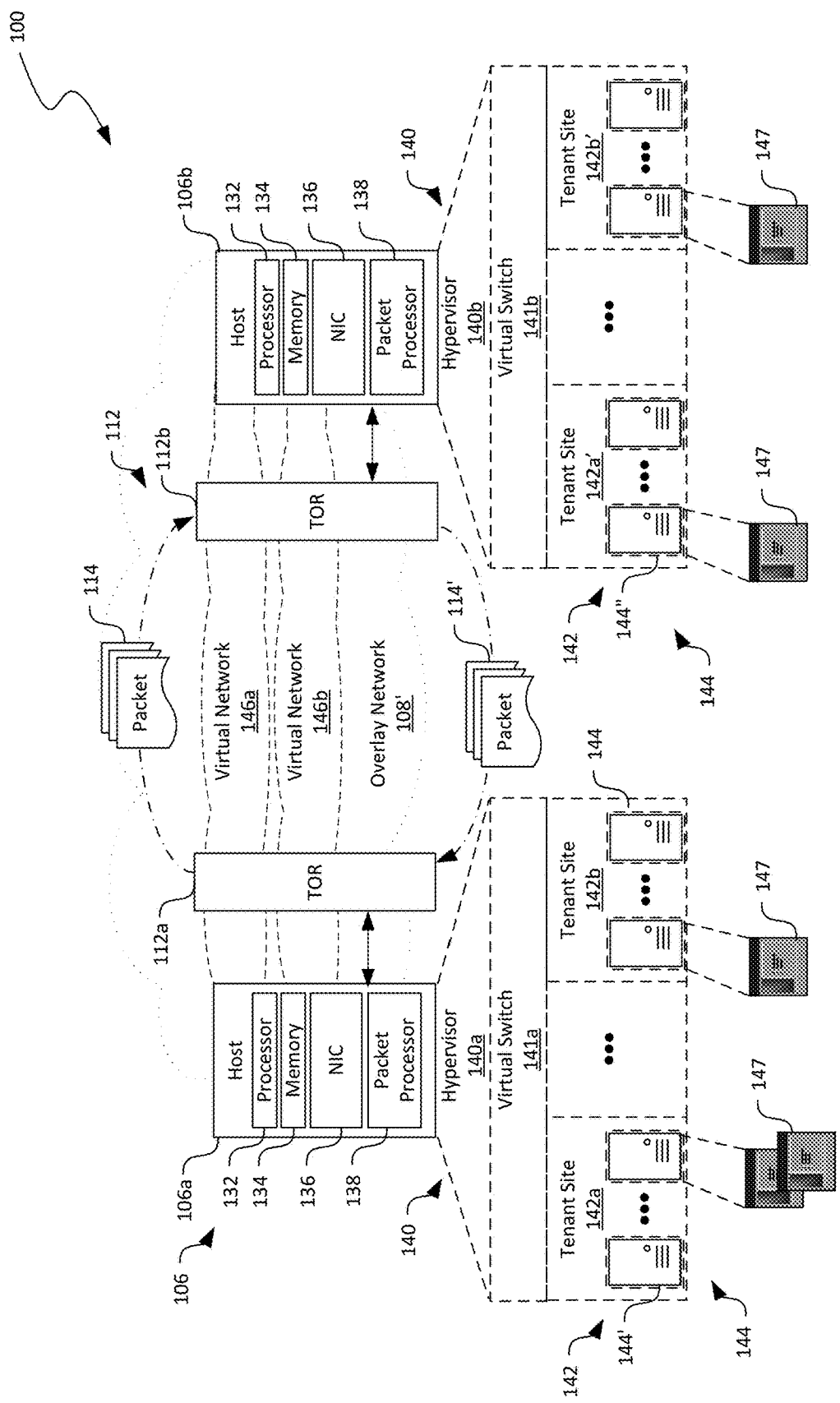
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM; magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A and 7B). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. For example, different virtual networks 146 can have different domain names, virtual network addresses, and/or other suitable identifiers. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, the virtual switches 141 can be configured to switch or filter packets (not shown) directed to different virtual machines 144 via the network interface card 136 and facilitated by the packet processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected and/or integrated with the NIC 136 in order to facilitate network processing operations for enforcing communications security, performing network virtualization, translating network addresses, maintaining a communication flow state, or performing other suitable functions. In certain implementations, the packet processor 138 can include a Field-Programmable Gate Array ("FPGA") integrated with or independent from the NIC 136. An FPGA can include an array of logic circuits and a hierarchy of reconfigurable interconnects that allow the logic circuits to be "wired together" like logic gates by a user after manufacturing. As such, a user can configure logic blocks in FPGAs to perform complex combinational functions, or merely simple logic operations to synthetize equivalent functionality executable in hardware at much faster speeds than in software. In the illustrated embodiment, the packet processor 138 has one network interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry. In any of the foregoing embodiments, the packet processor 138 can be programmed by the processor 132 (or suitable software components provided by the processor 132) to route packets inside the packet processor 138 in order to enable RDMA network traffic between two virtual machines 144 on a single or multiple host 106, as described in more detail below with reference to FIGS. 3A-4D.

In operation, the processor 132 and/or a user 101 (FIG. 1) can configure logic circuits in the packet processor 138 to perform complex combinational functions or simple logic operations to synthetize equivalent functionality executable in hardware at much faster speeds than in software. For example, the packet processor 138 can be configured to process inbound/outbound packets for individual RDMA flows according to configured policies or rules contained in a flow table such as a MAT. The flow table can also contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding policies in the flow table before forwarding the processed packet to the NIC 136 or TOR 112. For example, as shown in FIG. 2, the virtual machine 144, and/or other suitable software components on the first host 106a can generate an outbound packet 114 destined to, for instance, another virtual machine 144' at the second host 106b. Example outbound packet 114 can include RDMA connection request packet, RDMA connection reply packet, or RDMA data packet. The NIC 136 at the first host 106a can forward the generated packet 114 to the packet processor 138 for processing according to certain policies in a flow table. Once processed, the packet processor 138 can forward the outbound packet 114 to the first TOR 112a, which in turn forwards the packet 114 to the second TOR 112b via the overlay/underlay network 108 and 108'.

The second TOR 112b can then forward the packet 114 to the packet processor 138 at the second host 106b to be processed according to other policies in another flow table at the second hosts 106b. If the packet processor 138 cannot identify a packet as belonging to any flow, the packet processor 138 can forward the packet 114 to the processor 132 via the NIC 136 for exception processing. In another example, when the first TOR 112a receives an inbound packet 114', for instance, from the second host 106b via the second TOR 112b, the first TOR 112a can forward the packet 114' to the packet processor 138 to be processed according to a policy associated with a flow of the packet 114'. The packet processor 138 can then forward the processed packet 114' to the NIC 136 to be forwarded to, for instance, the application 147 or the virtual machine 144.

In certain implementations, the packet processor 138 is configured to always forward packets 114/114' to either the NIC 136 or the TOR 112 following a direct forwarding scheme. Such a direct forwarding scheme, however, would not allow RDMA to be implemented. For example, according to the direct forwarding scheme, the packet processor 138 may directly forward a RDMA connection reply packet from the virtual machine 114" to the TOR 112b. The RDMA connection reply packet, however, is identified by virtual network addresses corresponding to the first and second virtual machines 144' and 144". Upon receiving the RDMA connection reply packet, the TOR 112b would deem the packet to be invalid because the TOR 112b can only route packets identified by network addresses in the underlay network 108 (FIG. 1). As such, the RDMA connection attempt would fail.

Several embodiments of the disclosed technology can address at least some aspects of the foregoing limitations by implementing network traffic routing inside the packet processor 138. For example, a NIC buffer 161 (shown in FIG. 3A-3C) can be implemented in the packet processor 138 to temporarily store the RDMA connection reply packet while consulting the virtual switch 141 (or other suitable software components) for flow information of a flow to which the RDMA connection reply packet belongs. Once the flow information is received, the packet processor 138 can reroute the RDMA connection reply packet back to the inbound processing path to be processed according to the received flow information. As such, the packet processor 138 can facilitate establishment of an RDMA connection between the first and second virtual machines 144' and 144", as described in more detail below with reference to FIGS. 3A-4D.

Figure 3A:
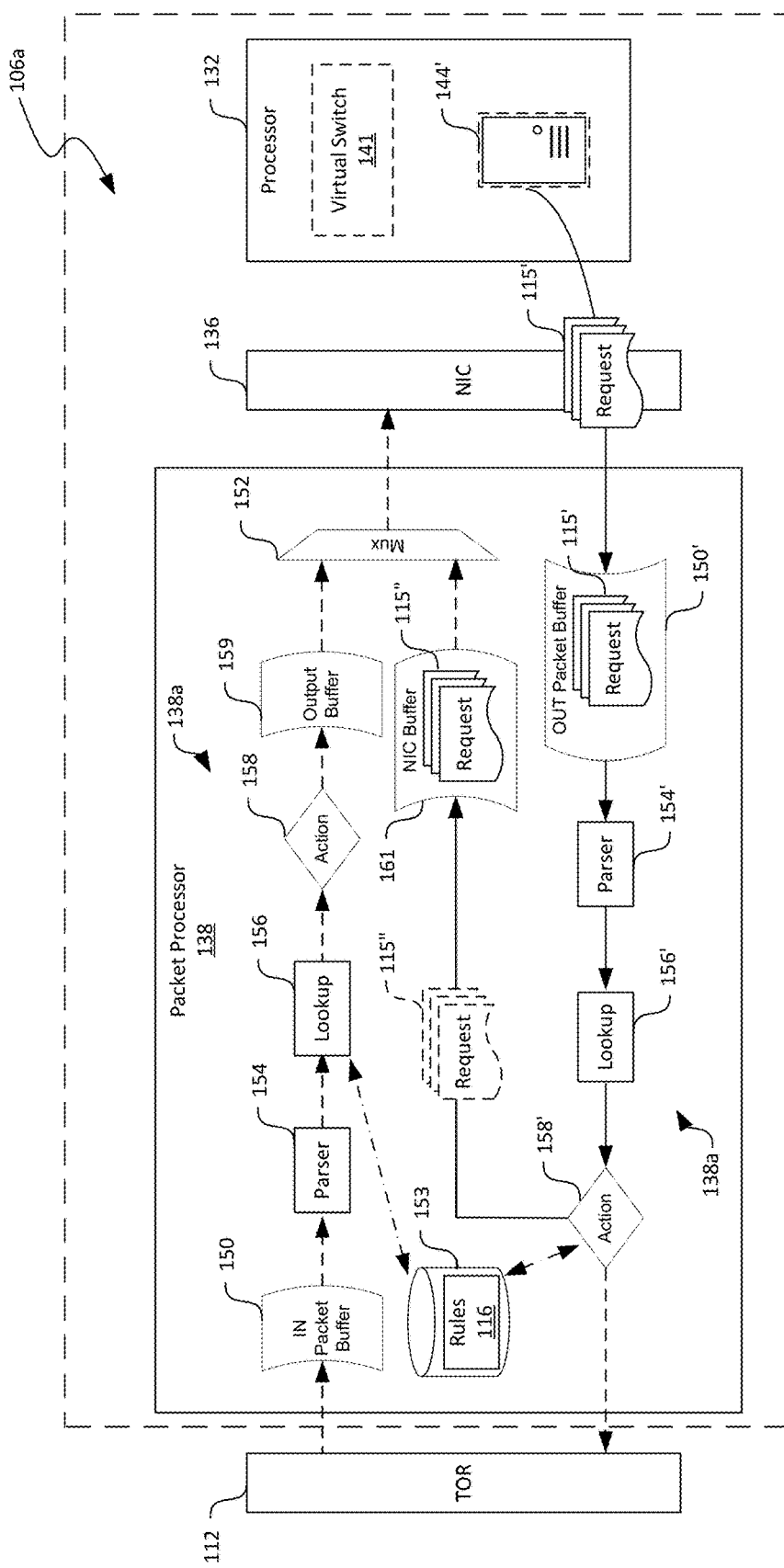
FIGS. 3A-3C are schematic diagrams illustrating a hardware packet processor implemented at a host in a distributed computing system during processing of an outbound packet for establishing an RDMA connection in accordance with embodiments of the disclosed technology.
Figure 3B:
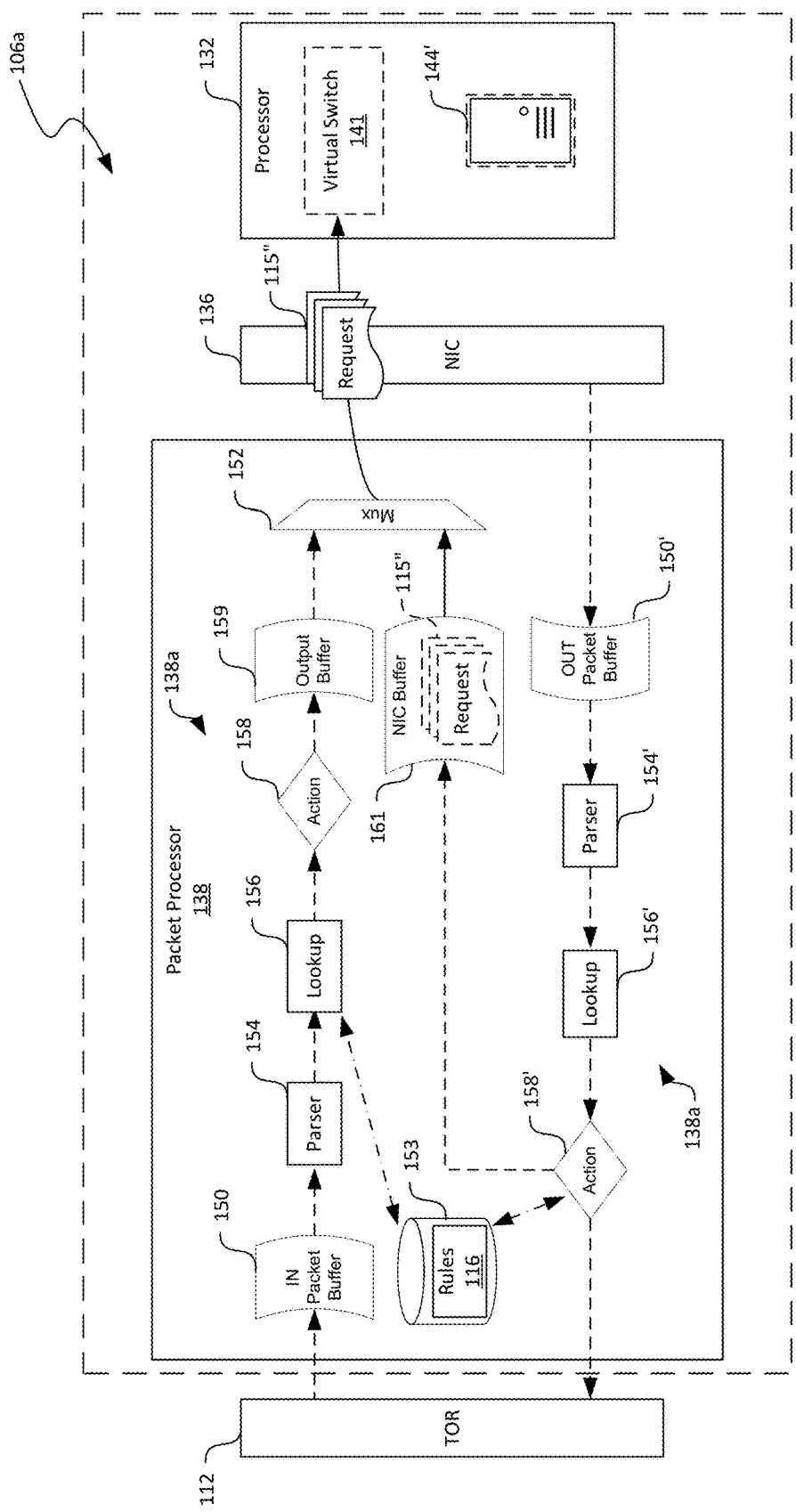
Figure 3C:
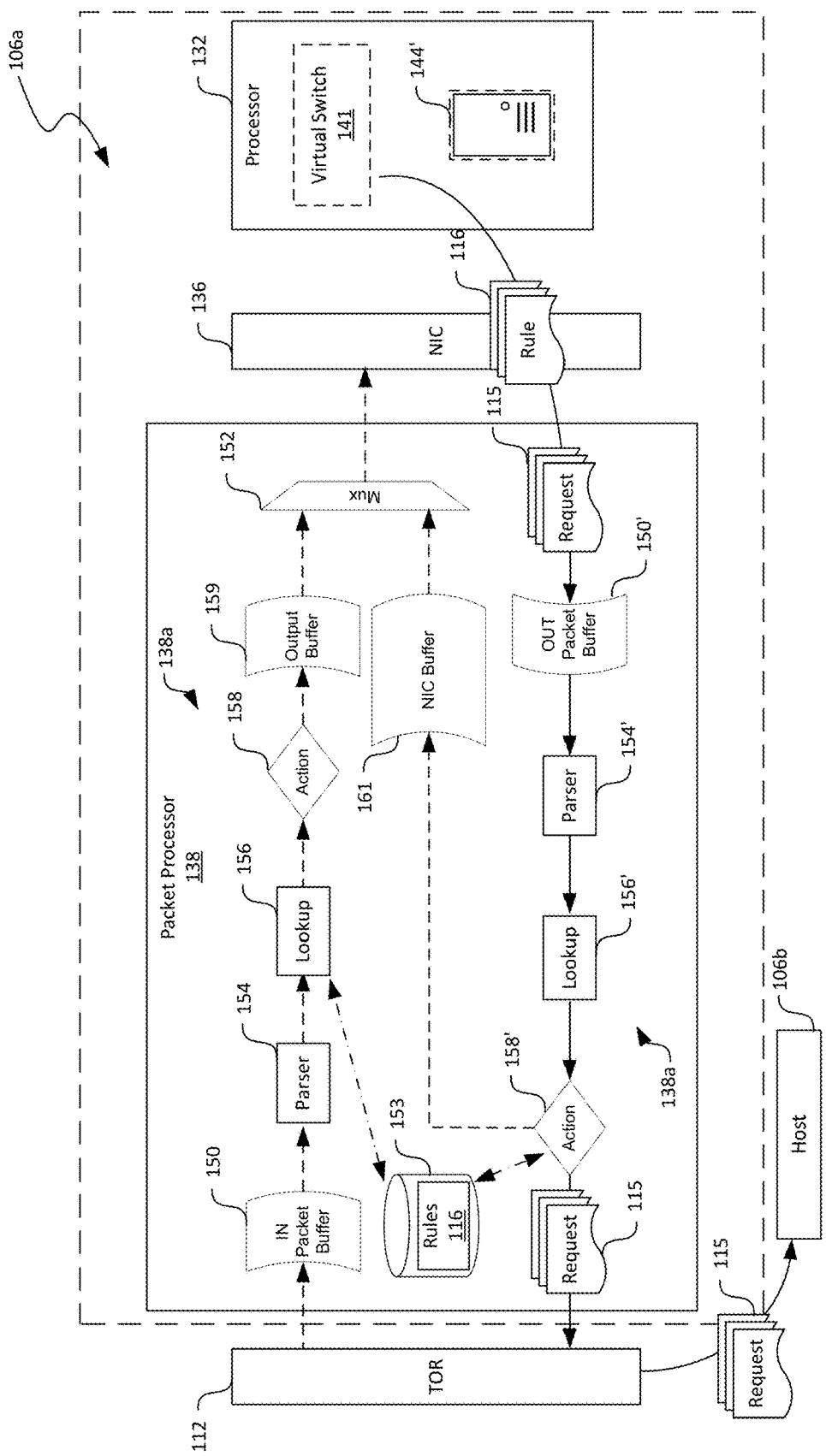

FIGS. 3A-3C are schematic diagrams illustrating a hardware packet processor 138 implemented at a host 106 in a distributed computing system 100 during processing of an outbound packet for establishing an RDMA connection in accordance with embodiments of the disclosed technology. As shown in FIG. 3A, in certain implementations, the packet processor 138 can include an inbound processing path 138a and an outbound processing path 138b in opposite processing directions. As shown in FIG. 3A, the inbound processing path 138a can include a set of processing circuits having an inbound packet buffer 150 (shown as "IN Packet Buffer" in FIG. 3A), a parser 152, a lookup circuit 156, an action circuit 158, and an output buffer 159 interconnected with one another in sequence. The outbound processing path 138b can include another set of processing circuits having an outbound packet buffer 150' (shown as "OUT Packet Buffer" in FIG. 3A), a parser 152', a lookup circuit 156', and an action circuit 158' interconnected with one another in sequence and in the opposite processing direction.

In accordance with embodiments of the disclosed technology, the packet processor 138 can also include a NIC buffer 161 and an inbound multiplexer 152 in the inbound processing path 138a. As shown in FIG. 3A, the NIC buffer 161 and the output buffer 159 are arranged to provide an output to the inbound multiplexer 152. In turn, the inbound multiplexer 152 can be configured to receive input from each of the NIC buffer 161 and the output buffer 159 in the inbound processing path 138a and provide an output to the NIC 136. The action circuit 158' in the outbound processing path 138b can include an input from the lookup circuit 156' and a first output to the TOR 112 and a second output to the NIC buffer 161.

As shown in FIG. 3A, the packet processor 138 can also include a memory 153 containing data representing a flow table having one or more policies or rules 116. The rules 116 can be configured by, for example, the virtual switch 141 or other suitable software components provided by the processor 132 to provide certain actions when corresponding conditions are met. Example conditions and actions are described in more detail below with reference to FIG. 6. Even though the flow table is shown being contained in the memory 153 in the packet processor 138, in other embodiments, the flow table may be contained in a memory (not shown) outside of the packet processor 138, in the memory 134 (FIG. 2), or in other suitable storage locations.

FIG. 3A shows an operation of the packet processor 138 when receiving an outbound RDMA packet from the first virtual machine 144' or a virtualized function (e.g., a virtualized NIC) associated with the first virtual machine 144'. As used herein, the term "virtualized function" generally refers to a virtualized portion of a physical resource at the host 106. In the example shown in FIG. 3A, the outbound RDMA packet is shown as a RDMA connection request packet 115' (referred to as "request packet"). In other examples, the outbound RDMA packet can also be a RDMA connection reply packet or other suitable types of RDMA packet. In FIG. 3A and other figures herein, solid connecting arrows represent a used processing path while dashed connecting arrows represent un-used processing path during certain operations.

As shown in FIG. 3A, the first virtual machine 144' or a virtualized function associated therewith can transmit the request packet 115' to the packet processor 138 via the NIC 136. Upon receiving the request packet 115', the packet processor 138 can store the received request packet 115' in the outbound packet buffer 150'. The outbound parser 154' can parse at least a portion of the header of the request packet 115' and forward the parsed header to the lookup circuit 156' in the outbound processing path 138b. The lookup circuit 156' can then attempt to match the request packet 115' to a flow in the flow table in the memory 153 based on the parsed header and identify an action for the request packet 115' as contained in the flow table. However, when lookup circuitry 156' cannot match the request packet 115' to any existing flow in the flow table because the request packet 115' may be a first packet for a new RDMA flow. As such, the action circuit 158' can then attach an exception flag to the request packet 115' and forward the request packet 115" with the exception flag to the NIC buffer 161 instead of the TOR 112.

As shown in FIG. 3B, the multiplexer 152 in the inbound processing path 138a can then retrieve the request packet 115" with the exception flag and forward the request packet 115" to the virtual switch 141 (or other suitable software components) via the NIC 136 for flow information associated with the request packet 115". In response, as shown in FIG. 3C, the virtual switch 141 (or other suitable software components) can then generates data representing flow information of a flow to which the request packet 115" belongs. The flow information can contain one or more rules 116 for the flow.

The virtual switch 141 can then transmit the created rules 116 to the packet processor 138 to be stored in the memory 153. In certain embodiments, the virtual switch 141 can forward the request packet 115" along with the rules 116 to the packet processor 138, which in turn processes the request packet 115" according to the rules 116. In other embodiments, the virtual switch 141 can process the request packet 115" (e.g., by encapsulating the request packet 115" with a network address of the second host 106b in the underlay network 108 of FIG. 1) and transmit the processed request packet 115 along with the rules 116 to the packet processor 138. In such embodiments, the virtual switch 141 can also include a special flag with the request packet 115 indicating to the packet processor 138 that processing of the request packet 115 is complete and the request packet 115 is to be forwarded directly to the TOR 112. In turn, the packet processor 138 can either process the request packet 115 according to the rules 116 received from the virtual switch 141 or forward the request packet 115 directly to the TOR 112 via the outbound processing path 138b. Upon receiving the request packet 115, the TOR 112 can then forward the request packet 115 to the second host 106b via the underlay network 108 (FIG. 1).

FIGS. 4A-4D are schematic diagrams illustrating a hardware packet processor 138 implemented at a host 106 in a distributed computing system 100 during processing of an inbound packet for establishing an RDMA connection in accordance with embodiments of the disclosed technology. In the illustrated embodiment, the inbound packet is shown as a request packet 115. In other embodiments, the inbound packet can also be other suitable types of RDMA packet.

Figure 4A:
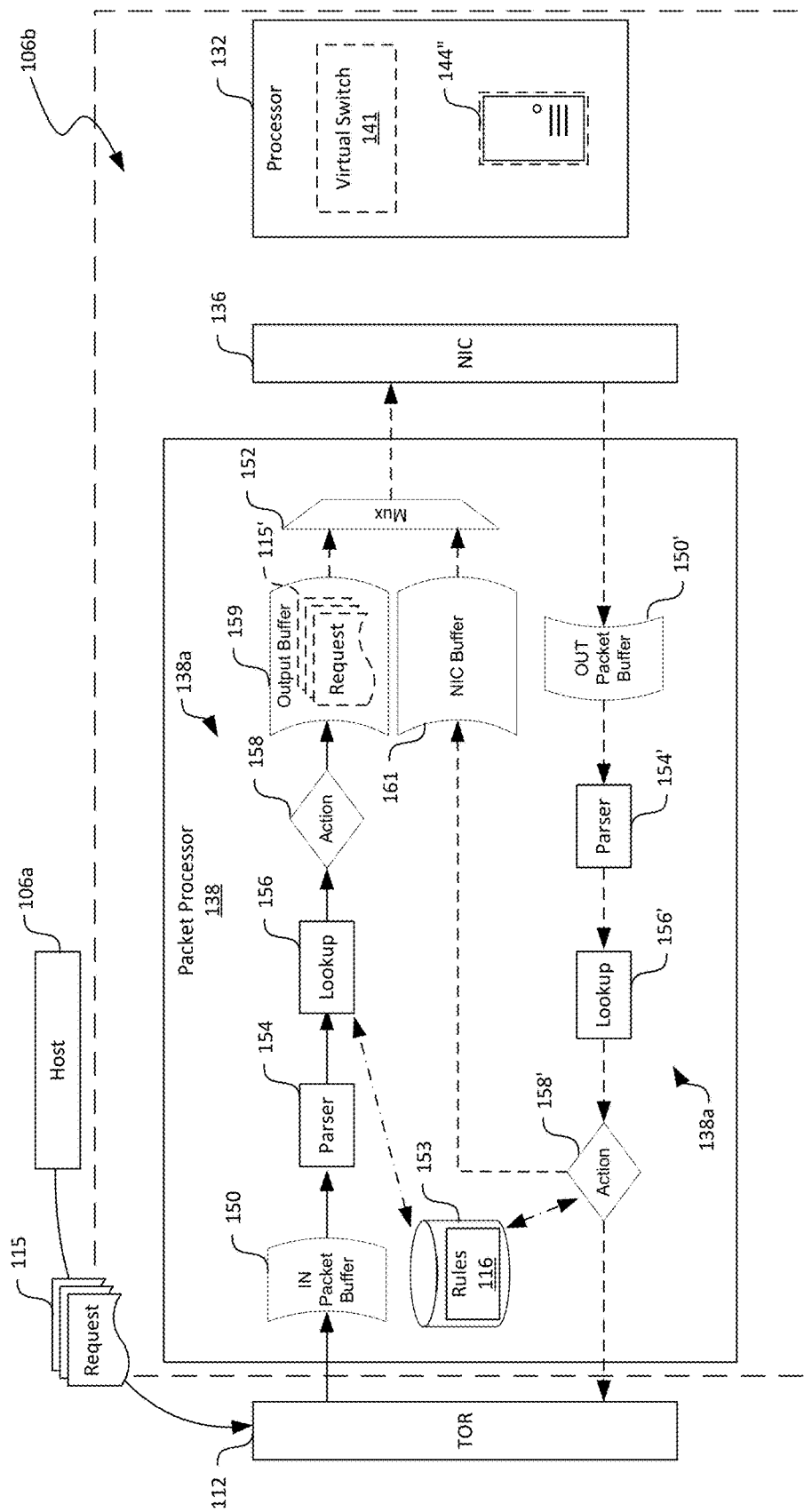
FIGS. 4A-4D are schematic diagrams illustrating a hardware packet processor implemented at a host in a distributed computing system during processing of an inbound packet for establishing an RDMA connection in accordance with embodiments of the disclosed technology.

As shown in FIG. 4A, upon receiving the request packet 115 from the first host 106a, the TOR 112 can forward the request packet 115 to the packet processor 138 to be stored in the inbound packet buffer 150. The inbound parser 154 can parse at least a portion of the header of the request packet 115 and forward the parsed header to the lookup circuit 156 in the inbound processing path 138a. The lookup circuit 156 can then attempt to match the request packet 115 to a flow in the flow table in the memory 153 based on the parsed header and identify an action for the request packet 115 as contained in the flow table. However, when lookup circuitry 156' cannot match the request packet 115 to any existing flow in the flow table because the request packet 115 may be a first packet for a RDMA connection. In response, the action circuit 158 can attach an exception flag to the request packet 115 and forward the request packet 115' with the exception flag to the output buffer 159 for further processing.

Figure 4B:
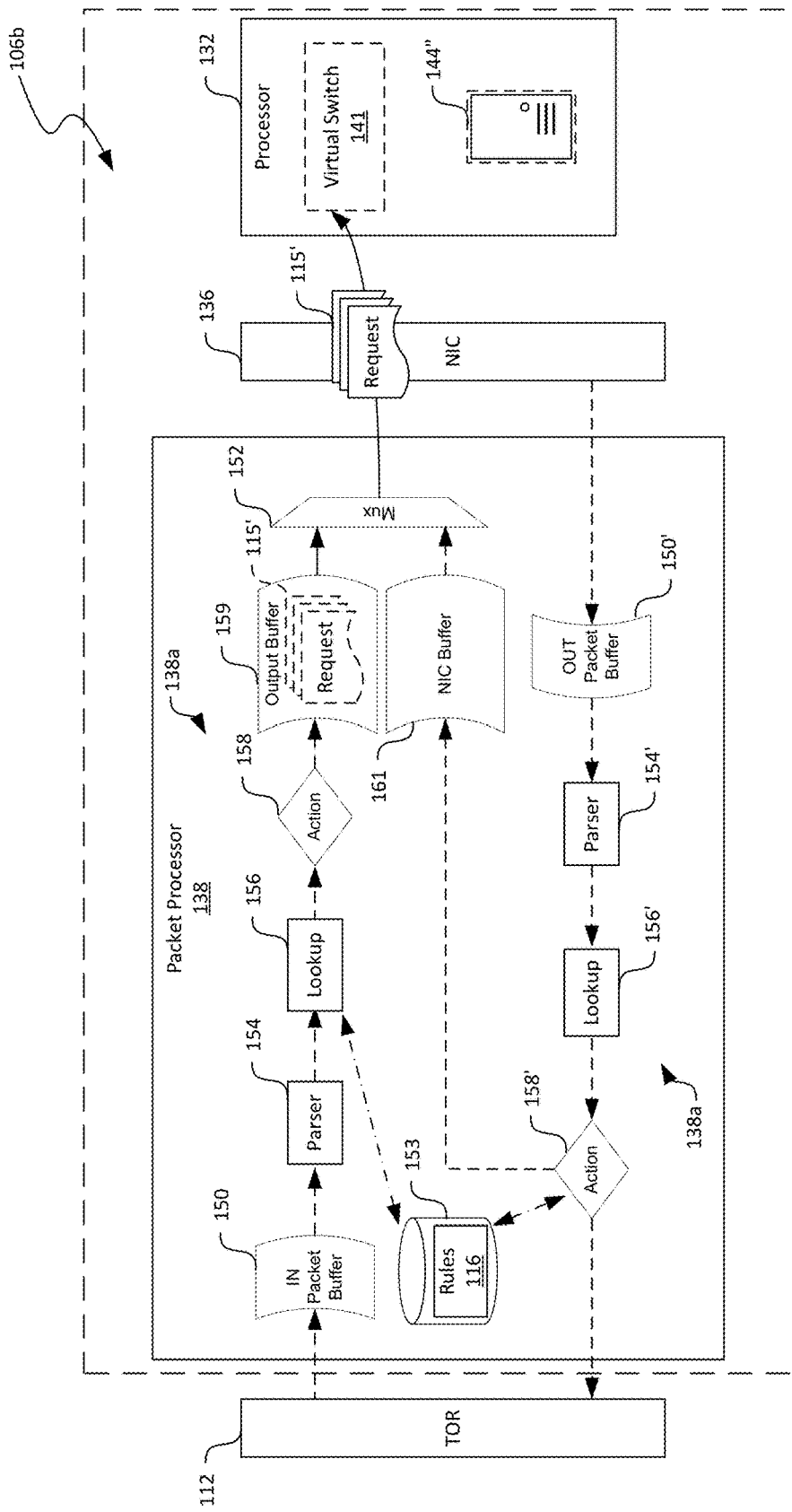
Figure 4C:
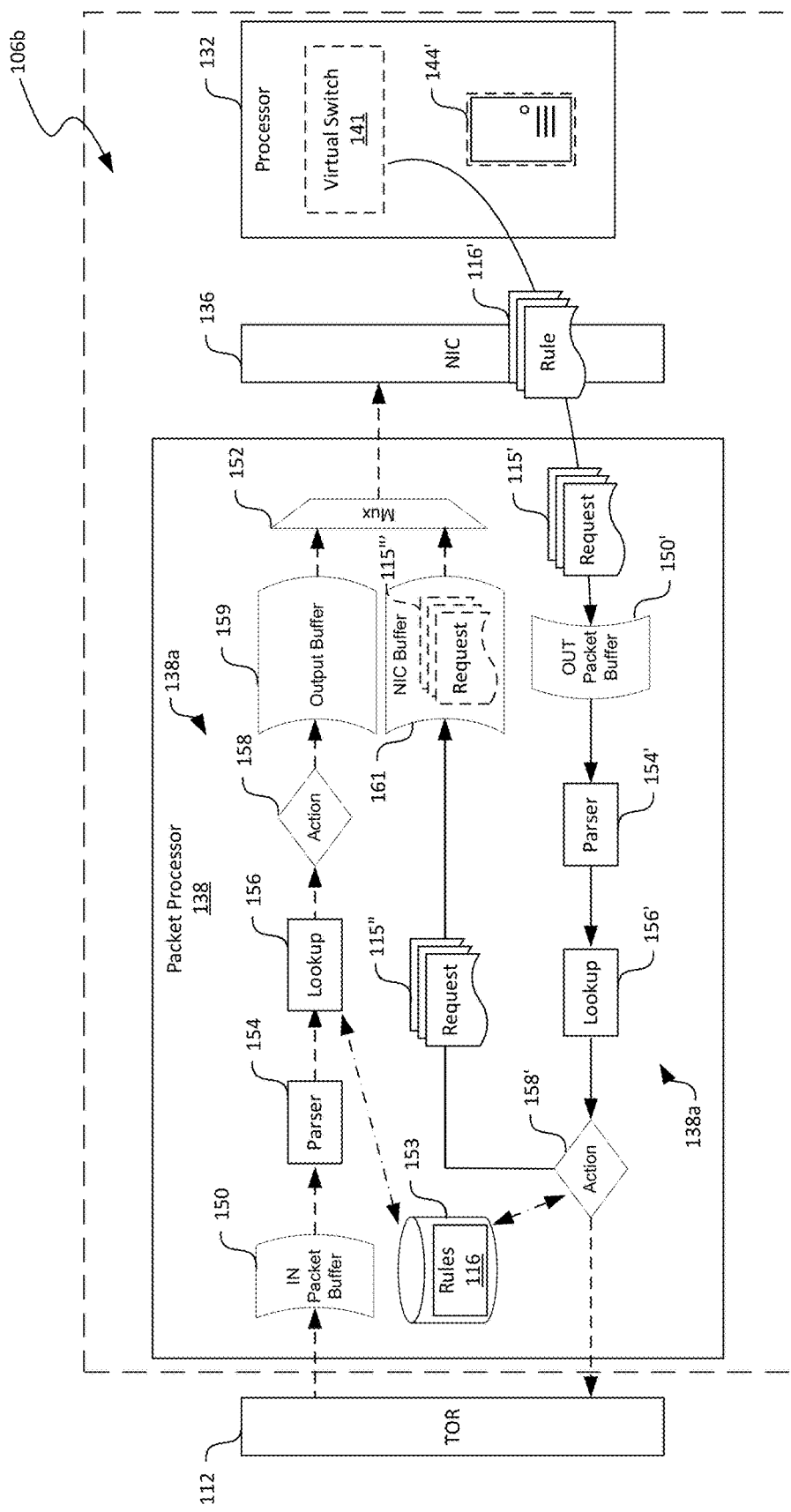
Figure 4D:
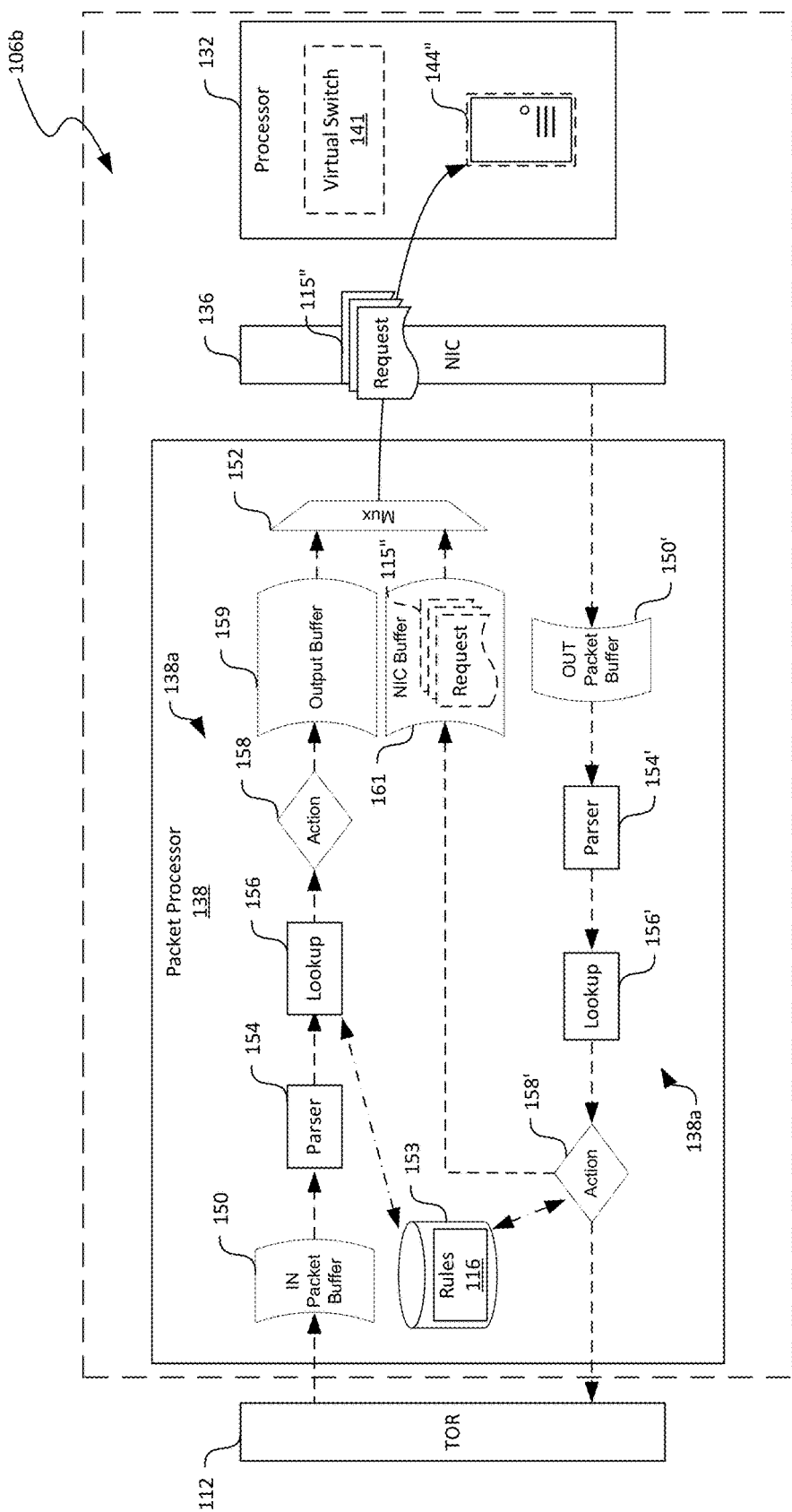

As shown in FIG. 4B, the multiplexer 152 in the inbound processing path 138a can then retrieve the request packet 115' with the exception flag and forward the request packet 115' to the virtual switch 141 (or other suitable software components) via the NIC 136 for flow information associated with the request packet 115'. In response, as shown in FIG. 4C, the virtual switch 141 (or other suitable software components) can then generates data representing a flow to which the request packet 115' belongs and one or more rules 116 for the flow. The virtual switch 141 can then forward the request packet 115' along with the rules 116 to the outbound processing path 138b. In turn, the outbound processing path 138b can process the request packet 115' according to the rules 116 to, for example, decapsulate the request packet 115' and remove a portion of the header of the request packet 115' containing the underlay network address of the second host 106b. The action circuit 158' can then forward the processed request packet 115" to the NIC buffer 161 instead of the TOR 112 according to the rules 116 received from the virtual switch 141. Then, the multiplexer 152 can retrieve the processed request packet 115" and forward the retrieved request packet 115" to the second virtual machine 144" or a virtual function associated with the second virtual machine 144" for further processing. Upon receiving the request packet 115", the second virtual machine 144" can then generate a reply packet (not shown) to the requested RDMA connection with the first virtual machine 144' and transmit the reply packet to the packet processor 138 via the NIC 136. The reply packet can then be processed by the packet processor 138 in operations generally similar to those described above with reference to FIGS. 3A-3C.

Figure 5A:
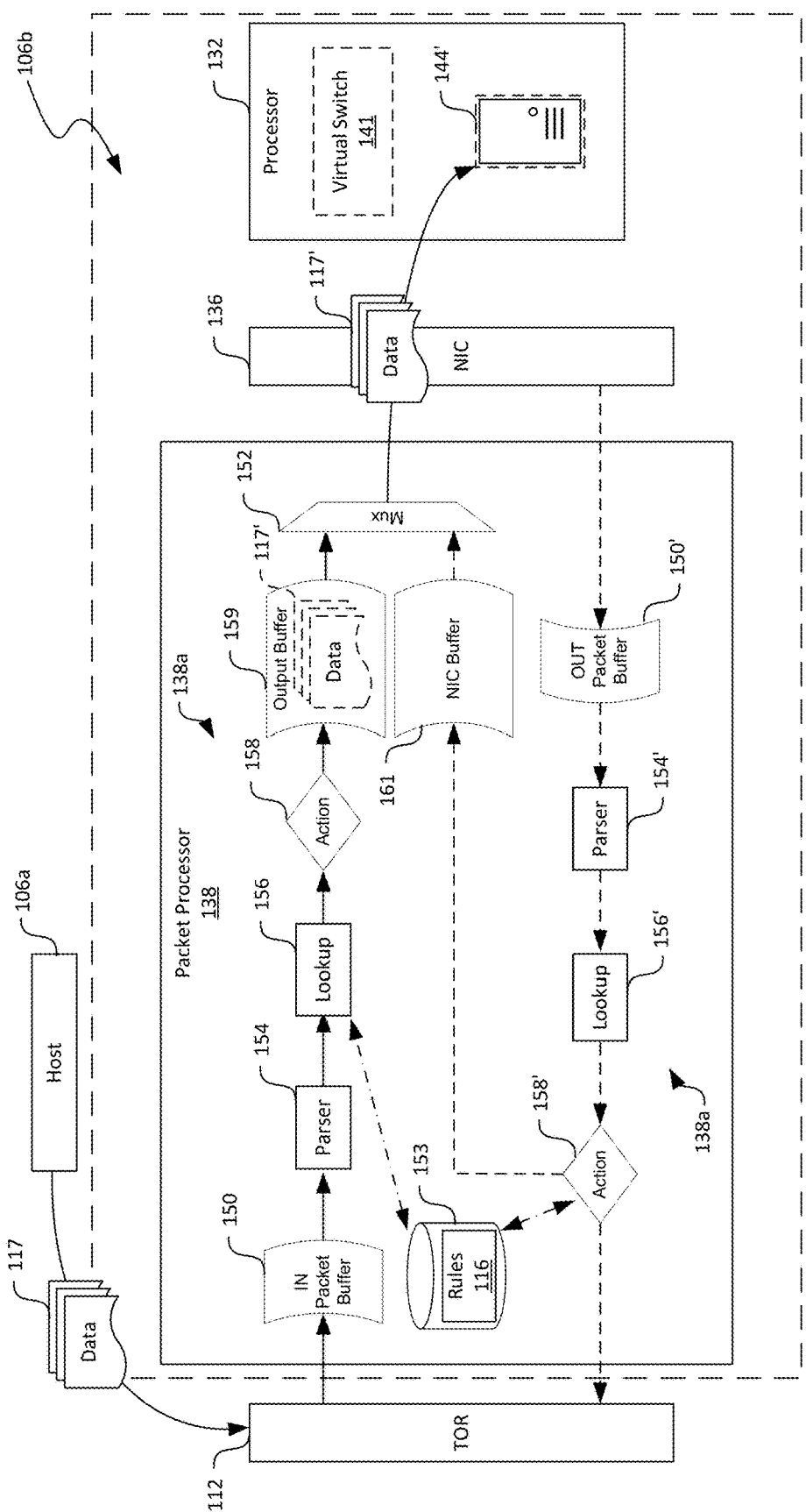
FIGS. 5A and 5B are schematic diagrams illustrating a hardware packet processor implemented at a host in a distributed computing system during processing of inbound and outbound packets via an RDMA connection in accordance with embodiments of the disclosed technology.
Figure 5B:
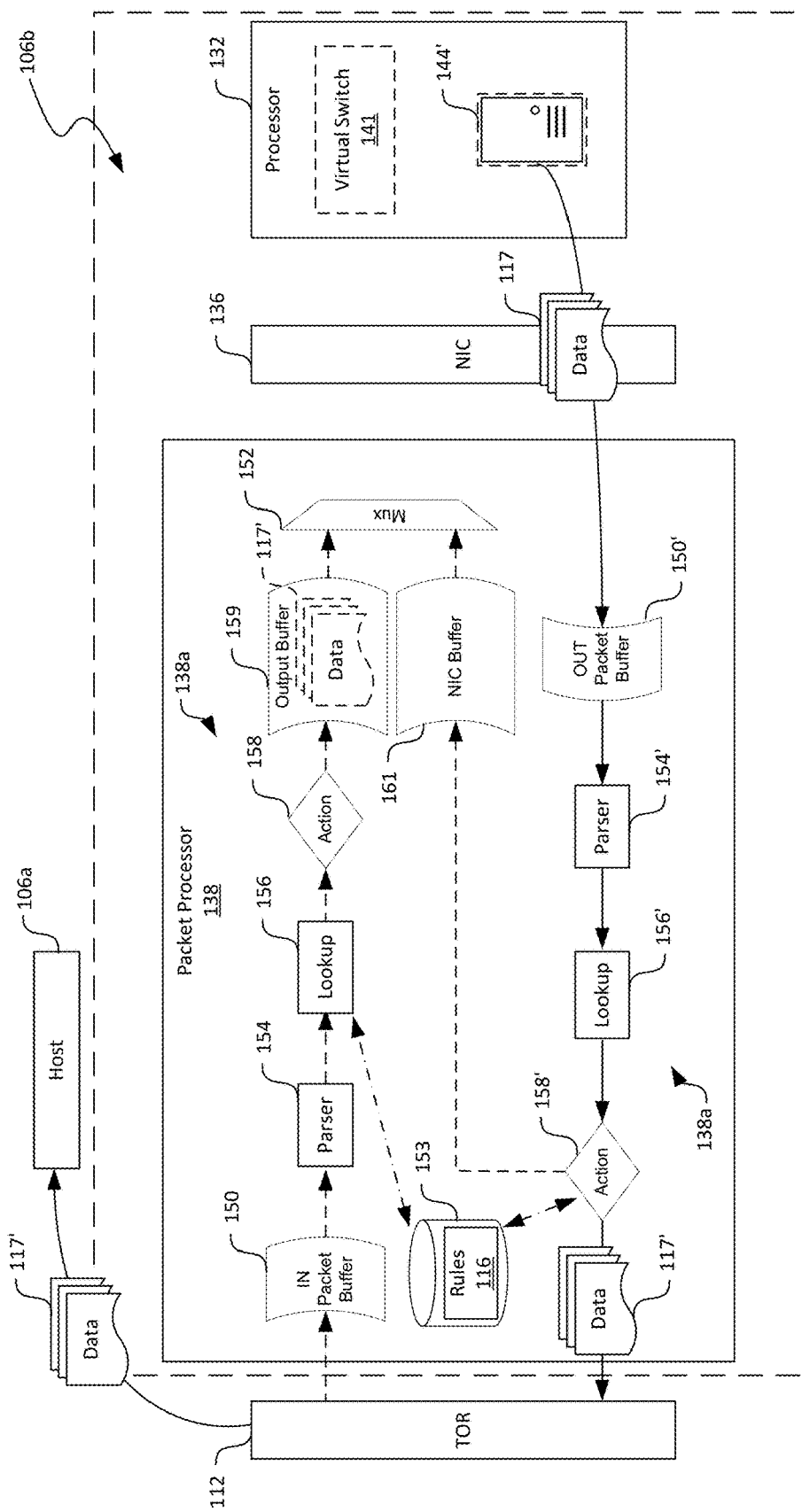

Upon establishing the RDMA connection between the first and second virtual machines 144' and 144", data packets 117 can be transmitted, as shown in FIGS. 5A and 5B. As shown in FIG. 5A, upon receiving a data packet 117 from, for example, the first virtual machine 144' (FIG. 2) at the first host 106a, the packet processor 138a at the second host 106b can store the data packet 117 in the inbound packet buffer 150, parsing a header of the data packet 117 with the parser 154, matching the data packet 117 with a flow with corresponding rules 116 with the lookup circuit 156, and perform actions identified by the rules 116 with the action circuit 158. The identified rules 116 can include those receive from the virtual switch 141 during connection establishment as described above with reference to FIGS. 3A-4D. Examples actions can include decapsulating the data packet 117 to expose virtual network addresses contained in the header of the data packet 117, or other suitable operations. The action circuit 158 can then forward the processed data packet 117' to the output buffer 159. In turn, the multiplexer 152 can retrieve the processed data packet 117' and forward the data packet 117' to the second virtual machine 144' or a virtual function associated therewith. Based on the received data packet 117', the second virtual machine 144'' can, for example, write certain data in the data packet 117' directly into a memory space allocated to the second virtual machine 144'' on the second host 106b. As shown in FIG. 5B, processing of outbound RDMA data packet 117 can be generally similar to processing the inbound data packet 117 in FIG. 5B except the outbound processing path 138b is utilized.

FIG. 6 is a schematic diagram illustrating example conditions and corresponding actions for a rule 116 (FIGS. 3A-4D) as an entry in a flow table in accordance with embodiments of the disclosed technology. In certain embodiments, as shown in FIG. 6, the rule 116 can include actions upon matching packets in a MAT model. When creating an entry, a network controller (not shown) can be expressive while reducing fixed policy in a data plane.

As shown in FIG. 6, the rule 116 can include a condition list containing multiple conditions 172, and one or more corresponding actions 176. Example conditions 172 can include source/destination MAC, source/destination IP, source/destination TCP port, source/destination User Datagram Protocol ("UDP") port, general routing encapsulation key, Virtual Extensible LAN identifier, virtual LAN ID, or other metadata regarding the payload of the packet. Conditions 172 can have a type (such as source IP address) and a list of matching values (each value may be a singleton, range, or prefix). For a condition to match a packet, any of the matching values can match as in an OR clause. For an rule 116 to match, all conditions 172 in the rule 116 match as in an AND clause.

The action 176 can also contain a type and a data structure specific to that type with data needed to perform the action. For example, an encapsulation rule 116 can takes as input data a source/destination IP address, source/destination MAC address, encapsulation format and key to use in encapsulating the packet. As shown in FIG. 5, the example actions can include allow/circuit a packet according to, for example, ACLs, network name translation (L3/L4), encapsulation/decapsulation, quality of service operations (e.g., rate limit, mark differentiated services code point, metering, etc.), encryption/decryption, stateful tunneling, and routing (e.g., equal cost multiple path routing).

The rule 116 can be implemented via a callback interface, e.g., initialize, process packet, and de-initialize. If a rule type supports stateful instantiation, the virtual switch 141 (FIG. 2) or other suitable types of process handler can create a pair of flows in the packet processor 138 (FIG. 3A). Flows can also be typed and have a similar callback interface to rules 116. A stateful rule 116 can include a time to live for a flow, which is a time period that a created flows can remain in a flow table after a last packet matches unless expired explicitly by a TCP state machine. In addition to the example set of actions 176 in FIG. 6, user-defined actions can also be added, allowing the network controllers to create own rule types using a language for header field manipulations.

Figure 7A:
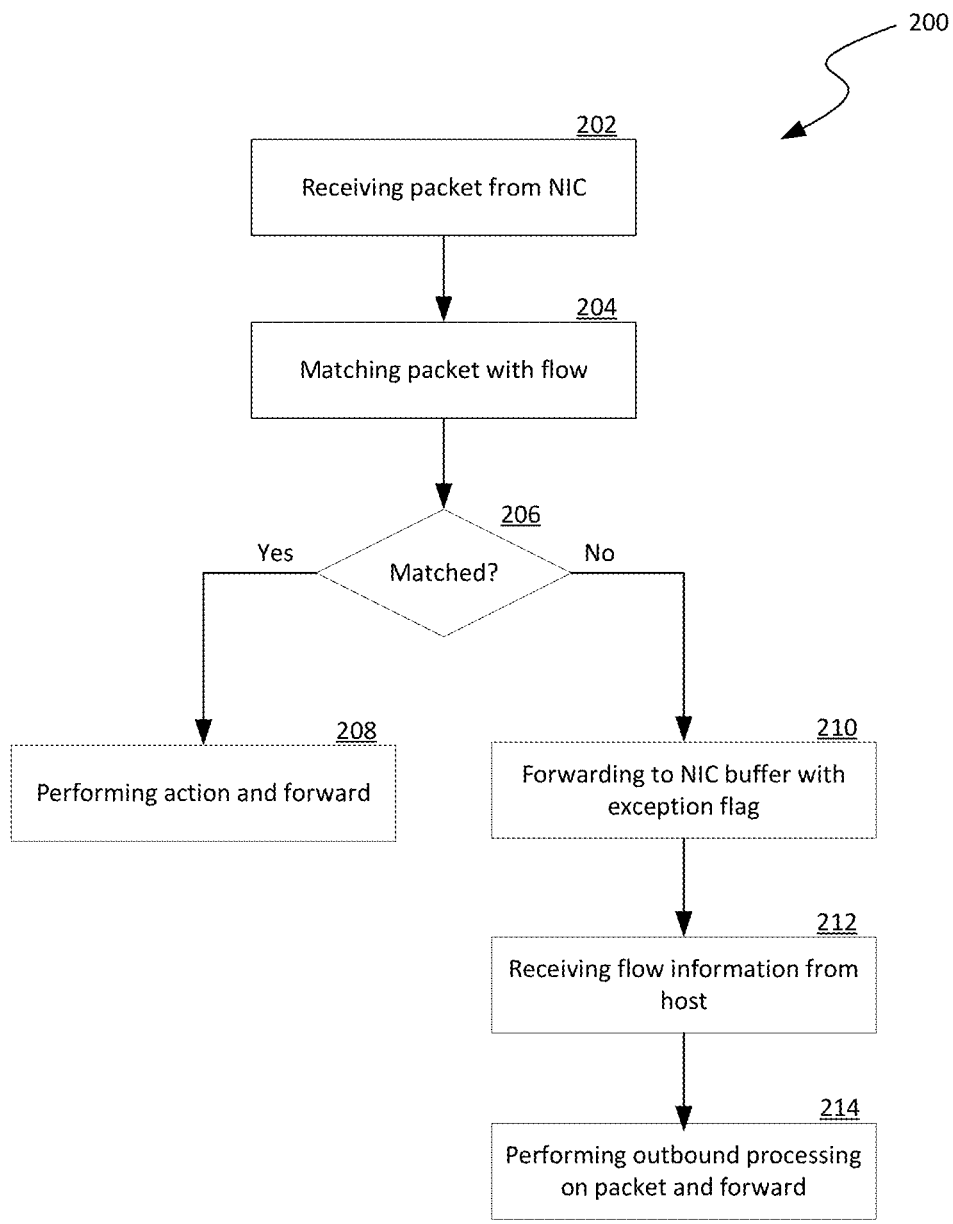
FIGS. 7A and 7B are flowcharts illustrating processes for RDMA network traffic routing in accordance with embodiments of the disclosed technology.
Figure 7B:
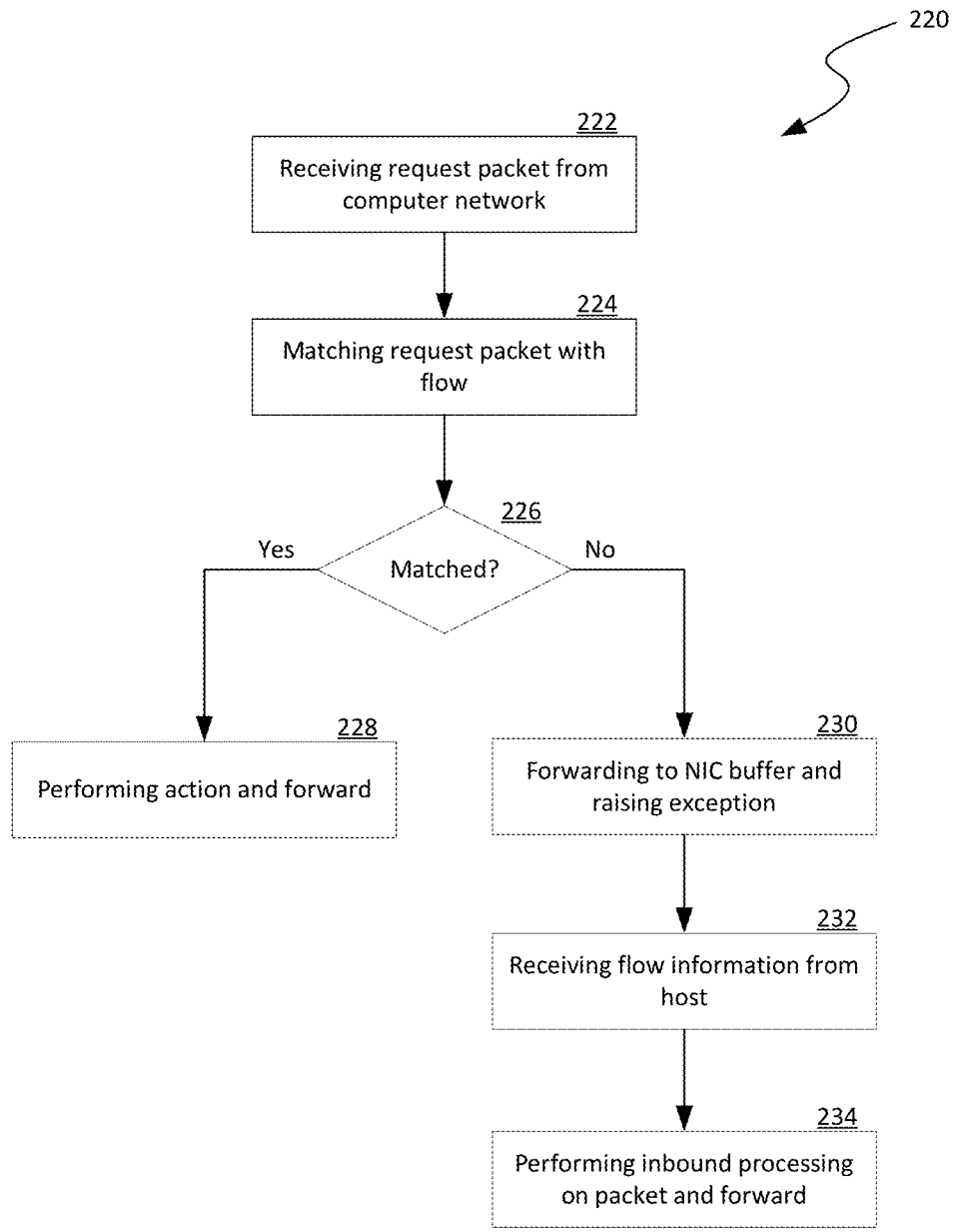

FIGS. 7A and 7B are flowcharts illustrating processes for RDMA network traffic routing in accordance with embodiments of the disclosed technology. Though the processes 200 and 220 are described below in light of the distributed computing system 100 of FIGS. 1-5B, in other embodiments, the processes can also be performed in other computing systems with similar or different components.

As shown in FIG. 7A, the process 200 can include receiving an outbound packet at stage 202. In certain embodiments, the outbound packet can be an RDMA connection request packet, RDMA connection reply packet, or other suitable types of packet received via a NIC 136 (FIG. 2) from an application 147 (FIG. 2), a virtual machine 144 (FIG. 2), or other software components on a host 106 (FIG. 2). The process 200 can then include matching the outbound packet with a flow in a flow table at stage 204. In certain embodiments, matching the inbound packet can include parsing a header of the inbound packet, matching at least a portion of the header to an entry in a flow table, and identifying an action corresponding to the entry. In other embodiments, matching the inbound packet can also include forwarding the inbound packet to a software component for further processing when an entry in the flow table cannot be located as matching the inbound packet.

The process 200 can then include a decision stage 206 to determine whether the outbound packet is matched to at least one flow in the flow table. In response to determining that the outbound packet is matched to at least one flow in the flow table, the process 200 can include performing actions associated with the identified flow and forwarding the processed outbound packet to the TOR at stage 208. The TOR 112 can then forward the outbound packet to a suitable destination in the distributed computing system 100 (FIG. 1) via the overlay/underlay network 108'/108. In response to determining that the outbound packet is not matched to at least one flow in the flow table, the process 200 can include forwarding the outbound packet to a NIC buffer 161 (FIG. 3A) with an exception flag at stage 210. The process 200 can then include forwarding the inbound packet with the exception flag to a software component in the host and receiving flow information from the software component at stage 212. The process 200 can further include performing outbound processing of the packet and forwarding the packet to the TOR at stage 214.

FIG. 7B illustrates a process 220 for inbound RDMA network traffic routing using a request packet as an example in accordance with embodiments of the disclosed technology. The process 220 can include receiving a request packet from a TOR 112 (FIG. 2) at stage 222. The process 200 can then include matching the received request packet with a flow in a flow table at stage 224. The matching operations can be generally similar those described above with reference to the process 200 in FIG. 7A.

The process 200 can then include a decision stage 206 to determine whether the request packet matches a flow in the flow table. In response to determining that the request packet matches a flow in the flow table, the process 220 can include performing actions associated with the identified flow and forwarding the request packet to the NIC 136, by, for example, copying the request packet into a buffer of the NIC 136 at stage 228. Otherwise, the process 220 can include forwarding the request packet to a NIC buffer 161 (FIG. 3A)

with an exception flag at stage 230. The process 220 can then include forwarding the request packet with the exception flag to a software component in the host and receiving flow information from the software component at stage 212. The process 220 can further include performing outbound processing of the packet and forwarding the packet to the TOR at stage 234.

FIG. 8 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for routing Remote Direct Memory Access ("RDMA") network traffic in a distributed computing system having a plurality of hosts interconnected by a computer network, the individual hosts having a main processor, a network interface card ("NIC"), and a hardware packet processor operatively coupled to one another, the method comprising:

receiving, from the computer network, a connection request packet at the packet processor of a host for establishing an RDMA connection with a virtual machine on the host and having access to the NIC via a corresponding virtual function;

determining whether the received connection request packet matches a flow in a flow table in the packet processor; and in response to determining that the received connection request packet does not match with any flow in the flow table, forwarding, via the NIC, the connection request packet to a software component provided by the main processor;

receiving, via the NIC, a copy of the connection request packet and flow information of a flow corresponding to the connection request packet from the software component;

processing the copy of the connection request packet according to the received flow information; and routing the processed connection request packet back to the NIC to be delivered to the virtual function of the virtual machine, thereby allowing the virtual machine to establish the RDMA connection.

2. The method of claim 1 wherein:

the packet processor having an inbound processing path and an outbound processing path in opposite processing direction than the inbound processing path;

processing the copy of the connection request packet includes processing the copy of the connection request packet following the outbound processing path; and routing the processed connection request packet back to the NIC includes routing the processed connection request packet back to the inbound processing path.

3. The method of claim 2 wherein:

the inbound processing path includes a parser, a lookup circuit, and an action circuit operatively coupled to one another in sequence; and determining whether the received connection request packet matches a flow in the flow table includes:

parsing a header of the received connection request packet with the parser; and determining whether at least a portion of the parsed header matches with an entry in the flow table.

4. The method of claim 2 wherein:

the inbound processing path includes a parser, a lookup circuit, an action circuit, and an output buffer operatively coupled to one another in sequence, the output buffer being configured to provide an output to the NIC;

the inbound processing path also include a NIC buffer configured to provide another output to the NIC separately from the output from the output buffer; and routing the processed connection request packet back to the NIC includes:

routing the processed connection request packet to the NIC buffer instead of the computer network; and retrieving and forwarding the processed connection request packet in the NIC buffer to the virtual function of the virtual machine via the NIC.

5. The method of claim 2 wherein:

the inbound processing path includes a parser, a lookup circuit, an action circuit, and an output buffer operatively coupled to one another in sequence, the output buffer being configured to provide an output to the NIC;

the inbound processing path also include a NIC buffer configured to provide another output to the NIC separately from the output from the output buffer;

the inbound processing path further includes a multiplexer between the NIC and the output buffer and between the NIC and the NIC buffer; and routing the processed connection request packet back to the NIC includes:

routing the processed connection request packet to the NIC buffer instead of the computer network; and retrieving and forwarding, using the multiplexer, the processed connection request packet from the NIC buffer to the virtual function of the virtual machine via the NIC.

6. The method of claim 1 wherein:

the flow information includes an action to decapsulate the received connection request packet; and processing the copy of the connection request packet includes decapsulating the received connection request packet before routing the processed connection request packet back to the NIC.

7. The method of claim 1 wherein:

the flow information includes one or more actions; and the method further includes:

receiving, from the computer network, a data packet at the packet processor;

matching the received data packet with the flow in the flow table corresponding to the RDMA connection;

processing the received data packet by performing, on the received data packet, the one or more actions in the flow information corresponding to the flow; and forwarding the processed data packet to the virtual function of the virtual machine via the NIC.

8. The method of claim 1 wherein:

the flow information includes one or more actions; and the method further includes:

receiving, via the NIC and from the virtual function of the virtual machine, a data packet at the packet processor;

matching the received data packet with the flow in the flow table corresponding to the RDMA connection;

processing the received data packet by performing, on the received data packet, the one or more actions in the flow information corresponding to the flow; and forwarding the processed data packet to the computer network without routing the processed data packet to the NIC buffer.

9. A method for routing Remote Direct Memory Access ("RDMA") network traffic in a distributed computing system having a plurality of hosts interconnected by a computer network, the individual hosts having a main processor, a network interface card ("NIC"), and a hardware packet processor operatively coupled to one another, the method comprising:

receiving, from the NIC of a first host, a connection request packet at the packet processor of the first host for establishing an RDMA connection between a first virtual machine hosted on the first host with a second virtual machine hosted on a second host, the first virtual machine having access to the NIC via a corresponding virtual function on the first host;

determining whether the received connection request packet matches a flow in a flow table in the packet processor of the first host; and in response to determining that the received connection request packet does not match with any flow in the flow table, routing the connection request packet back to the NIC to be delivered to a software component provided by the main processor;
receiving, via the NIC, a copy of the connection request packet and flow information of a flow corresponding to the connection request packet from the software component; and
forwarding the received copy of the connection request packet from the software component to the computer network to be delivered to the second host hosting the second virtual machine, thereby allowing the first virtual machine to establish the RDMA connection with the second virtual machine.

10. The method of claim 9 wherein:
receiving the copy of the connection request packet includes receiving the copy of the connection request packet that is processed by the software component; and
forwarding the received copy of the connection request packet includes forwarding the received copy of the connection request packet without modifying the received copy of the connection request packet.

11. The method of claim 9 wherein:
receiving the copy of the connection request packet includes receiving the copy of the connection request packet that is identical to the connection request packet initially received at the packet processor; and
forwarding the received copy of the connection request packet includes:
processing the received copy of the connection request packet according to the received flow information; and
forwarding the processed copy of the connection request packet to the computer network to be delivered to the second host hosting the second virtual machine.

12. The method of claim 11 wherein:
the computer network includes an underlay network and an overlay network implemented on the underlay network;
the flow information includes an action to encapsulate a packet with a network address of the second host in the underlay network;
receiving the connection request packet includes receiving the connection request packet having a header containing a network address of the second virtual machine in the overlay network; and
processing the received copy of the connection request packet includes encapsulating the connection request packet with the network address of the second host in the underlay network before forwarding the connection request packet to the computer network.

13. The method of claim 9 wherein:
the packet processor having an inbound processing path and an outbound processing path in opposite processing direction than the inbound processing path;
determining whether the received connection request packet matches a flow includes determining whether the received connection request packet matches a flow using the outbound processing path; and
routing the connection request packet back to the NIC includes routing the connection request packet back to the NIC via the inbound processing path.

14. The method of claim 13 wherein:
the inbound processing path includes a parser, a lookup circuit, and an action circuit operatively coupled to one another in sequence; and
determining whether the received connection request packet matches a flow in the flow table includes:
parsing a header of the received connection request packet with the parser; and
determining whether at least a portion of the parsed header matches with an entry in the flow table.

15. The method of claim 13 wherein:
the inbound processing path includes a parser, a lookup circuit, an action circuit, and an output buffer operatively coupled to one another in sequence, the output buffer being configured to provide an output to the NIC;
the inbound processing path also include a NIC buffer configured to provide another output to the NIC separately from the output from the output buffer; and
routing the connection request packet back to the NIC includes:
routing the connection request packet back to the NIC buffer instead of the computer network; and
retrieving and forwarding the connection request packet from the NIC buffer to the software component provided by the main processor.

16. The method of claim 13 wherein:
the inbound processing path includes a parser, a lookup circuit, an action circuit, and an output buffer operatively coupled to one another in sequence, the output buffer being configured to provide an output to the NIC;
the inbound processing path also include a NIC buffer configured to provide another output to the NIC separately from the output from the output buffer;
the inbound processing path further includes a multiplexer between the NIC and the output buffer and between the NIC and the NIC buffer; and
routing the connection request packet back to the NIC includes:
routing the connection request packet to the NIC buffer instead of the computer network; and
retrieving and forwarding, using the multiplexer, the connection request packet from the NIC buffer to the virtual function of the virtual machine via the NIC.

17. The method of claim 9 wherein:
the flow information includes one or more actions; and
the method further includes:
receiving, from the NIC, a data packet at the packet processor;
matching the received data packet with the flow in the flow table corresponding to the RDMA connection;
processing the received data packet by performing, on the received data packet, the one or more actions in the flow information corresponding to the flow; and
forwarding the processed data packet to the second virtual machine hosted on the second host via the computer network.

18. A computing device in a distributed computing system, the computer device being interconnected to other computing devices in the distributed computing system via a computer network, the computer device comprising:
a main processor;
a network interface card ("NIC") operatively coupled to the main process; and
a field programmable gate array ("FPGA") operatively coupled to the main processor via the NIC, the FPGA including:
an inbound processing path having an inbound packet buffer configured to receive an inbound packet from the computer network, a NIC buffer, and a multiplexer between the inbound packet buffer and the NIC, the multiplexer being also between the NIC buffer and the NIC; and an outbound processing path having an outbound action circuit configured to perform one or more actions on an outbound packet, the outbound action circuit having:
  an input to receive the outbound packet from the NIC;
  a first output to the computer network; and
  a second output to the NIC buffer in the inbound processing path.

19. The computing device of claim 18 wherein:
the FPGA further includes a memory containing a flow table with entries individually including one or more conditions and one or more corresponding actions; and
the outbound action circuit is configured to forward the outbound packet to the computer network via the first output or to the NIC buffer via the second output based on whether the outbound packet matches one of the entries in the flow table.

20. The computing device of claim 18 wherein:
the FPGA further includes a memory containing a flow table with entries individually including one or more conditions and one or more corresponding actions;
the outbound action circuit is configured to forward the outbound packet to the computer network via the first output when the outbound packet matches one of the entries in the flow table or to the NIC buffer via the second output when the outbound packet does not match one of the entries in the flow table; and
the multiplexer in the inbound processing path is configured to retrieve and forward the outbound packet from the NIC buffer back to the NIC.

* * * * *